United States Patent
Heeks et al.

(10) Patent No.: US 6,838,140 B1
(45) Date of Patent: Jan. 4, 2005

(54) FUSER MEMBER HAVING PLATINUM CATALYZED ADDITION CURED SILICONE LAYER

(75) Inventors: George J. Heeks, Rochester, NY (US); Arnold W. Henry, Pittsford, NY (US); Santokh S. Badesha, Pittsford, NY (US); David J. Gervasi, West Henrietta, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/461,062

(22) Filed: Jun. 13, 2003

(51) Int. Cl.⁷ ............................................... B29D 22/06
(52) U.S. Cl. .................. 428/36.8; 428/36.91; 428/329; 428/339; 428/421; 428/447; 428/448; 399/333
(58) Field of Search .......................... 399/333; 492/56; 428/36.8, 36.91, 329, 339, 421, 447, 448, 450; 528/31, 32

(56) References Cited

U.S. PATENT DOCUMENTS

| | | | | |
|---|---|---|---|---|
| 4,604,424 A | * | 8/1986 | Cole et al. .................. | 524/862 |
| 5,217,837 A | * | 6/1993 | Henry et al. ................ | 430/124 |
| 6,090,887 A | * | 7/2000 | Nakamura et al. .......... | 524/862 |
| 6,336,026 B1 | * | 1/2002 | Heeks et al. ................ | 399/302 |
| 6,472,078 B1 | * | 10/2002 | Shudo et al. ................ | 428/447 |

* cited by examiner

Primary Examiner—Ramsey Zacharia
(74) Attorney, Agent, or Firm—Annette L. Bade

(57) ABSTRACT

A fuser component useful in electrostatographic machines, having a substrate, and thereover a silicone rubber layer having the crosslinked product of at least one platinum catalyzed addition curable vinyl terminated polyorganosiloxane, aluminum oxide fillers, iron oxide fillers, a crosslinking agent, and having an optional outer fluoroelastomer layer.

17 Claims, 5 Drawing Sheets

FUSER MEMBER HAVING PLATINUM CATALYZED ADDITION CURED SILICONE LAYER

BACKGROUND OF THE INVENTION

The present invention relates generally to an imaging apparatus and fuser components thereof for use in electrostatographic, including digital, contact electrostatic printing, and like apparatuses. The fuser components, including fuser members, pressure member, donor members, external heat member, and the like, are useful for many purposes including, in the case of a fuser member, fixing a toner image to a copy substrate. More specifically, the present invention relates to fuser components comprising a platinum catalyzed addition cured silicone layer. In embodiments, the silicone layer is positioned on a substrate, which may be of many configurations including a roller, belt, film, or like substrate. In other embodiments, the silicone rubber layer has an outer layer thereon. In embodiments, there is positioned between the substrate and the silicone layer, and/or between the silicone layer and the outer layer, an intermediate and/or adhesive layer. The present invention may be useful as tuser members in xerographic machines, including color machines.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another important method for reducing offset, is to impart antistatic and/or field assisted toner transfer properties to the fuser. However, to control the electrical conductivity of the release layer, the conformability and low surface energy properties of the release layer are often affected.

U.S. Pat. No. 4,711,818 teaches a fuser member having as a layer, a crosslinked product of a mixture of at least one polyfluoroorganosiloxane, filler, heat stabilizer, crosslinking agent and crosslinking catalyst.

U.S. Pat. No. 4,659,621 teaches a one-layer platinum catalyzed addition cured silicone layer as a coating on a donor roller for an electrostatographic machine.

U.S. Pat. No. 4,763,158 teaches a fuser member having as a layer, a platinum catalyzed addition cured silicone material.

U.S. Pat. No. 4,777,087 teaches a platinum catalyzed addition cured polyorganosiloxane useful as layers in a fuser member for an electrostatographic apparatus.

U.S. Pat. No. 4,868,251 teaches an ultraviolet light absorbing silicone composition. A platinum catalyzed vinyl/hydride addition cured silicone material can be used in crosslinking. The silicone material can be used in lenses.

U.S. Pat. No. 4,925,895 teaches a polyorganosiloxane platinum catalyzed addition curable silicone elastomer useful as a layer for a fuser member useful in xerographic machines.

U.S. Pat. No. 4,983,641 teaches a platinum-catalyzed addition cured silicone foamable composition.

U.S. Pat. No. 5,082,871 teaches a platinum catalyzed addition curable polyorganosiloxane release coating composition.

U.S. Pat. No. 5,164,462 teaches an ultraviolet light absorbing silicone elastomer that is crosslinked using a platinum-catalyzed addition cured silicone material. The silicone materials may be useful in lenses.

U.S. Pat. No. 5,217,837 teaches a peroxide cured silicone elastomer layer for a fuser member.

U.S. Pat. No. 5,352,753 teaches an ultraviolet light absorbing silicone layer with filler. The silicone may be formed with a crosslinking agent that is a platinum catalyzed addition cured silicone. An amino siloxane is disclosed as a crosslinking agent. The coating is useful as a lens material.

U.S. Pat. No. 5,401,570 teaches a fuser member comprising a substrate and thereover, a silicone rubber containing a filler. The silicone elastomer can be peroxide cured.

U.S. Pat. No. 5,464,896 teaches an addition cured silicone layer with fluorocarbon outer surface as coatings for fuser members.

U.S. Pat. No. 5,466,768 teaches an ultraviolet light absorbing silicone layer with filler. The silicone may be formed with a crosslinking agent that is a platinum catalyzed addition cured silicone. An amino siloxane is disclosed as a crosslinking agent. The coating is useful as a lens material.

U.S. Pat. No. 5,474,821 teaches a fuser member having a layer of platinum catalyzed addition cured silicone material.

Known fuser coatings include high temperature polymers such as polytetrafluoroethylene, perfluoroalkoxy, fluorinated ethylene propylene, silicone rubber, fluorosilicone rubber, fluoroelastomers, and the like. These coatings have been found to have adequate release properties and control toner offset sufficiently. However, problems have resulted with known fuser member layers, including that the fuser member prematurely hardens resulting in a life short fall. Some known fuser members have also been shown to show a susceptibility to contamination, scratching and other damage. Further, silicone rubber layers tend to swell upon application of release agents. Moreover, fuser members have been shown to provide toner offset or inferior release capability, which allows for inappropriate copies and/or prints, and toner contamination to other parts of the machine.

In order to solve some of the above problems, a boron nitride filler has been introduced into a silicone rubber to provide a superior layer material. However, use of boron nitride is expensive and has been found not to solve: all the above problems.

A platinum catalyzed addition cured silicone layer as a layer for fuser members has been shown to correct some, if not all, of the above problems. For example, the layer improves delivery and processability. However, the layer is not thermally conductive or thermally stable.

Therefore, a need remains for fuser components for use in electrostatographic machines that have superior mechanical properties, including the ability to maintain superior heat age stability, and consequently, improved life short fall. A further need remains for fuser coatings having increased toughness and increased tensile strength, having a reduced susceptibility to contamination, scratching, and other damage. In addition, a need remains for a fuser component with a decreased tendency to swell in the presence of release agents. A need further remains for a fuser member layer, which decreases toner offset, resulting in a decrease or elimination of inferior prints and/or copies and toner contamination to other parts of the machine. In addition, a need remains for a fuser member having superior thermal conductivity, good conformability, lower modulus, and lower hardness. Further, it is desired to dispense with the need for expensive fillers such as boron nitride in the fuser layer(s).

SUMMARY OF THE INVENTION

The present invention provides, in embodiments, a fuser member for fixing a developed image to a copy substrate comprising a) a substrate; and thereover b) a silicone rubber layer comprising the crosslinked product of i) at least one platinum catalyzed addition curable vinyl terminated polyorganosiloxane having the following Formula I:

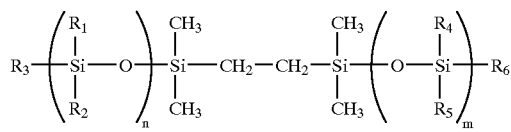

wherein $R_1$, $R_2$, $R_4$, $R_5$ are the same or different and are selected from the group consisting of $(CH_2)_pCH_3$ wherein p is a number of from about 0 to about 6, phenyl, and $CH_2CH_2CF_3$; $R_3$ is selected from the group consisting of H and $(CH_2)_pCH_3$ where p is a number of from about 0 to about 6; $R_6$ is selected from the group consisting of $CH_2=CH$ and $(CH_2)_pCH_3$ where p is a number of from about 0 to about 6; n is a number of from about 10 to about 4,000; and m is a number of from about 2 to about 4000; i) aluminum oxide fillers; iii) iron oxide fillers; and iv) a crosslinking agent.

The present invention further includes, in embodiments, a fuser member for fixing a developed image to a copy substrate comprising: a) a substrate; and thereover b) a silicone rubber layer comprising the crosslinked product of i) at least one platinum-catalyzed addition curable vinyl terminated polyorganosiloxane having the following Formula I:

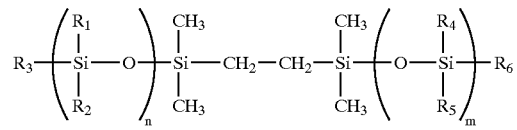

wherein $R_1$, $R_2$, $R_4$, $R_5$ are the same or different and are selected from the group consisting of $(CH_2)_pCH_3$ wherein p is a number of from about 0 to about 6, phenyl, and $CH_2CH_2CF_3$; $R_3$ is selected from the group consisting of H and $(CH_2)_pCH_3$ where p is a number of from about 0 to about 6; $R_6$ is selected from the group consisting of $CH_2=CH$ and $(CH_2)_pCH_3$ where p is a number of from about 0 to about 6; n is a number of from about 10 to about 4,000; and m is a number of from about 2 to about 4000; ii) aluminum oxide fillers; iii) iron oxide fillers; and iv) a crosslinking agent; and c) an outer layer positioned on said silicone rubber layer, wherein said outer layer comprises a fluoroelastomer.

In addition, the present invention provides, in embodiments, an image forming apparatus for forming images on a recording medium comprising a charge-retentive surface to receive an electrostatic latent image thereon; a development component to apply toner to said charge-retentive surface to develop an electrostatic latent image to form a developed image on said charge retentive surface; a transfer film component to transfer the developed image from said charge retentive surface to a copy substrate; and a fusing component for fusing toner images to a surface of said copy substrate, said fusing component comprising a) a substrate; and thereover b) a silicone rubber layer comprising the crosslinked product of i) at least one platinum catalyzed addition curable vinyl terminated polyorganosiloxane having the following Formula I:

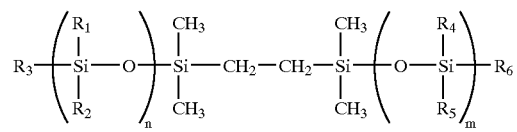

wherein $R_1$, $R_2$, $R_4$, $R_5$ are the same or different and are selected from the group consisting of $(CH_2)_pCH_3$ wherein p is a number of from about 0 to about 6, phenyl, and $CH_2CH_2CF_3$; $R_3$ is selected from the group consisting of H and $(CH_2)_pCH_3$ where p is a number of from about 0 to about 6; $R_6$: is selected from the group consisting of $CH_2=CH$ and $(CH_2)_pCH_3$ where p is a number of from about 0 to about 6; n is a number of from about 10 to about 4,000; and m is a number of from about 2 to about 4000; ii) aluminum oxide fillers; iii) iron oxide fillers; and iv) a crosslinking agent.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to fuser components, and in particular, fusing components including fuser members; pressure members; donor members such as release agent donor members, release agent metering members, and the like; transfix or transfuse members; external heat members; and the like. In an embodiment of the present invention, the fuser component comprises a substrate and a layer comprising a platinum catalyzed addition cured silicone rubber. In another embodiment, the fuser component comprises a substrate having an intermediate layer comprising a platinum catalyzed addition cured silicone rubber thereon, and having an outer layer on the silicone intermediate layer. In embodiments, optional adhesive and/or intermediate layers can be present between the substrate and the silicone layer, and/or between the silicone intermediate layer and the outer release layer. In embodiments, the silicone layer contains aluminum oxide and iron oxide fillers dispersed or contained therein.

The present silicone rubber layer has been shown, in embodiments, to have superior mechanical properties, including the ability to maintain superior heat age stability, and consequently, improved life short fall. The silicone rubber fuser coatings, in embodiments, have increased toughness and increased tensile strength, and have a reduced susceptibility to contamination, scratching, and other damage. In addition, the silicone rubber fuser layer, in embodiments, has a decreased tendency to swell in the presence of release agents. The silicone rubber fuser member layer, in embodiments, also decreases toner offset, resulting in a decrease or elimination of inferior prints and/or copies and toner contamination to other parts of the machine. In addition, in embodiments, the silicone rubber fuser member layer exhibits superior thermal conductivity, good conformability, lower modulus, and lower hardness. Further, with the silicone rubber layer, in embodiments, there is no need for expensive fillers such as boron nitride.

Figure 1:
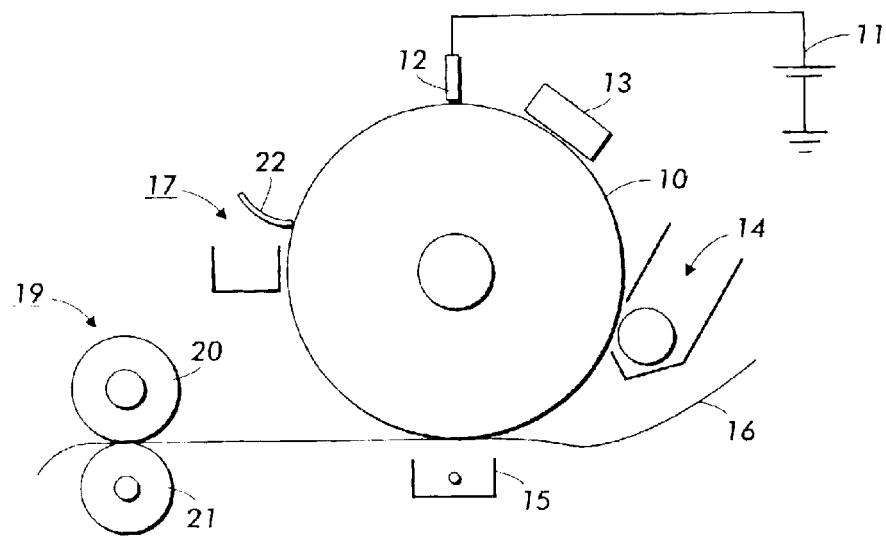
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 105 is cleaned therefrom by use of a blade 22 (as shown in FIG. 1), brush, or other cleaning apparatus. Although the fusing station 19 depicts the fusing and pressure members as rollers, the fuser and/or pressure member(s) may also be in the form of belts, sheets, films or other like fusing members.

Figure 2:
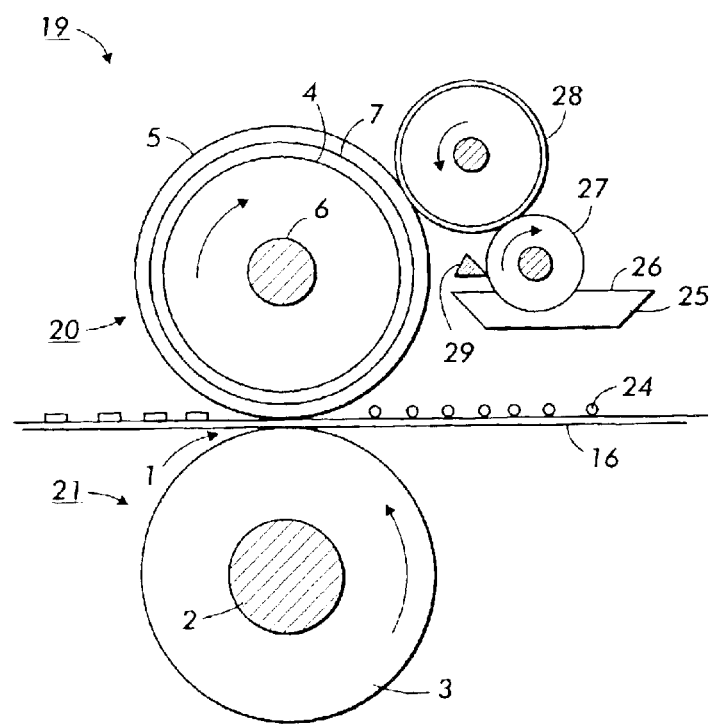
FIG. 2 is a sectional view of a fusing belt in accordance with one embodiment of the present invention.

Referring to FIG. 2, an embodiment of a fusing station 19 is depicted with an embodiment of a fuser roll 20 comprising polymer surface 5 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. The fuser member 20 can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26 that may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, by metering device 29, preferably from about 0.1 to about: 2 micrometers or greater thicknesses of release fluid can be applied to the surface of polymer or elastomer 5.

Figure 3:
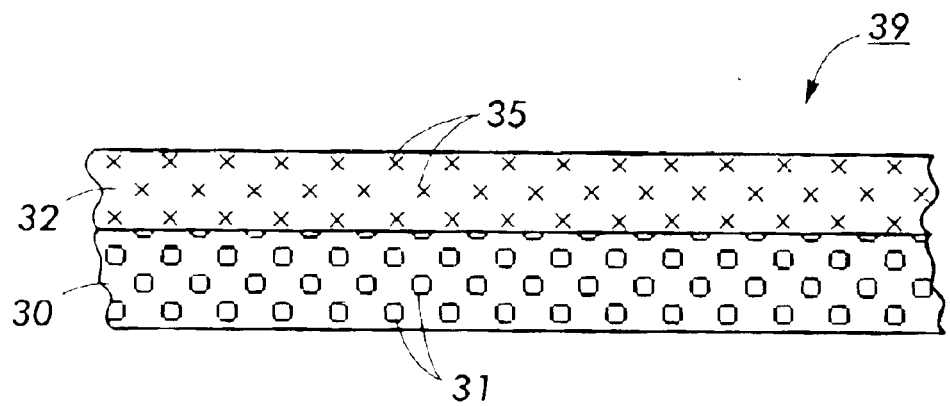
FIG. 3 is a schematic illustration of an embodiment of the present invention, and represents a fuser component having a two-layer configuration, wherein the silicone layer is the outer layer.

The fusing component of the present invention can be comprised of at least two different configurations. In one embodiment of the invention, the fusing component is of a two-layer configuration as shown in FIG. 3. FIG. 3 demonstrates fusing component as fuser belt 39. However, it is understood that this and other configurations herein such as a fuser roller, can be used as the fusing member. Fuser member 39 comprises substrate 30 having optional fillers 31 dispersed or contained therein. Positioned over the substrate is outer silicone rubber layer 32 having optional fillers 35 dispersed or contained therein.

Figure 4:
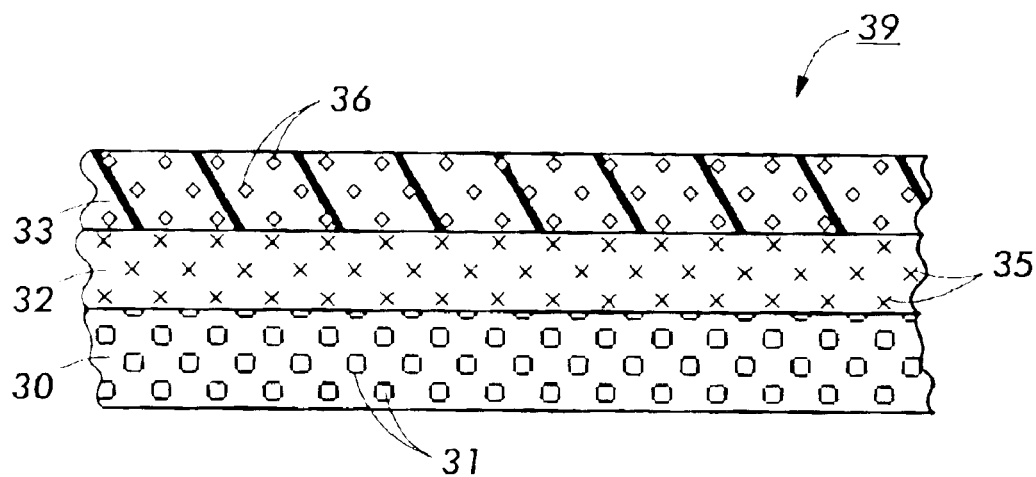
FIG. 4 is an illustration of an embodiment of the present invention, and represents a fuser component having a three-layer configuration, wherein the silicone layer is the intermediate layer.

FIG. 4 demonstrates an alternative embodiment of the fuser member 39, which is that of a three-layer configuration. FIG. 4 demonstrates substrate 30 having optional fillers 31 dispersed or contained therein. Positioned on the substrate 30 is intermediate silicone layer 32 having optional fillers 35 dispersed or contained therein. Positioned over the intermediate silicone layer 32 is outer release layer 33 having optional fillers 36 dispersed or contained therein.

An adhesive layer, or other intermediate layer or layers may be present between the substrate and the silicone intermediate layer. Fillers 31, 35, and 36 are optional, and if present, may be the same or different.

Examples of suitable substrate materials include in the case of roller or film-type substrates, metals such as aluminum, stainless steel, steel, nickel and the like. In the case of film-type substrates, suitable substrates include high temperature plastics that are suitable for allowing a high operating temperature (i.e., greater than about 80° C., preferably greater than 200° C.), and capable of exhibiting high mechanical strength. In embodiments, the plastic has a flexural strength of from about 2,000,000 to about 3,000,000 psi, and a flexural modulus of from about 25,000 to about 55,000 psi. Plastics possessing the above characteristics and which are suitable for use as the substrate for the fuser members include epoxy; polyphenylene sulfide such as that sold under the tradenames FORTRON® available from Hoechst Celanese, RYTON R-4® available from Phillips Petroleum, and SUPEC® available from General Electric; polyimides such as polyamideimide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid; and the like; liquid crystalline resin (XYDAR®) available from Amoco; ULTEM® available from General Electric; ULTRAPEK® available from BASF; and the like, and mixtures thereof. Other suitable substrate materials include fluoroelastomers such as those sold under the tradename VITON® from DuPont; silicone rubbers, and other elastomeric materials. The substrate may also comprise a mixture of any of the above materials. In embodiments, the substrate comprises aluminum.

The substrate as a film, sheet, belt, or the like, has a thickness of from about 25 to about 250, or from about 60 to about 100 micrometers.

Over the substrate is the platinum catalyzed addition cured silicone layer. The silicone layer may be positioned over an adhesive, primer or other layer. The silicone layer may be cured using addition-curing techniques. These addition-curing techniques include two-component systems, and one-component systems. The one-component system can be used if the catalyst is inhibited sufficiently. These systems may be made by adding a polyfunctional silicon hydride crosslinker to a vinyl-containing silicone polymer.

Vinyl on the end of the polymer is more reactive than vinyl in the chain. The catalyst is usually a complex of platinum, although palladium, rhodium and ruthenium can also be used. The following reaction demonstrates an addition cured technique.

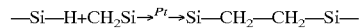

In the above system, there are no volatile by-products. The compounds have excellent resistance to compression set and to reversion. Elastomers produced have demonstrated increased toughness, tensile strength and dimensional stability. Both terminal and internal vinyl groups may be cured by this method, although the former usually leads to greater toughness.

The amount of platinum used can be from about 1 to about 25 ppm, or from about 5 to about 10 ppm. The starting products are used in ratio of from about 20:0.5 to about 10:0.5, or from about 10:1 to about 10:2 by weight of —SiH— to $CH_2$=$CH_2Si$. The stoichiometry of the hydride to the vinyl components can be from about 1:1 to about 10:1, or about 1:1 to about 6:1.

The silicone elastomer layer comprises a two-component platinum catalyzable addition cured silicone rubber formed by the reaction below:

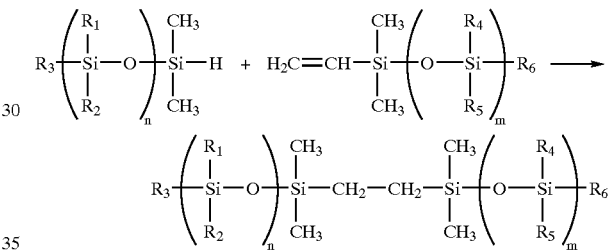

wherein $R_1$, $R_2$, $R_4$, $R_5$ are the same or different and can be $(CH_2)_pCH_3$ where p is a number of from about 0 to about 6, or from about 1 to about 4, phenyl, or $CH_2CH_2CF_3$; $R_3$ is H, $(CH_2)_pCH_3$ where p is a number of from about 0 to about 6, or from about 1 to about 4; $R_6$ is $CH_2$=$CH$ or $(CH_2)_pCH_3$ where p is a number of from about 0 to about 6, or from about 1 to about 4; n is a number of from about 10 to about 4,000; and m is a number of from about 2 to about 4000. The product above is the following Formula I:

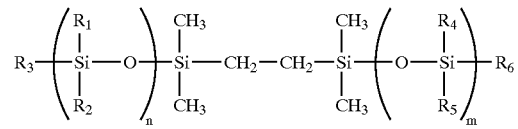

wherein R., $R_2$, $R_4$, $R_5$ are the same or different and can be $(CH_2)_pCH_3$ where p is a number of from about 0 to about 6, or from about 1 to about 4, phenyl, or $CH_2CH_2CF_3$; $R_3$ is H, $(CH_2)_pCH$, where p is a number of from about 0 to about 6, or from about 1 to about 4; $R_6$ is $CH_2$=$CH$ or $(CH_2)_pCH_3$ where p is a number of from about 0 to about 6, or from about 1 to about 4; n is a number of from about 10 to about 4,000; and m is a number of from about 2 to about 4000.

In an embodiment, the silicone material is divinyl-terminated. A specific example of a divinyl-terminated platinum catalyzed addition cured silicone material is formed by the reaction below:

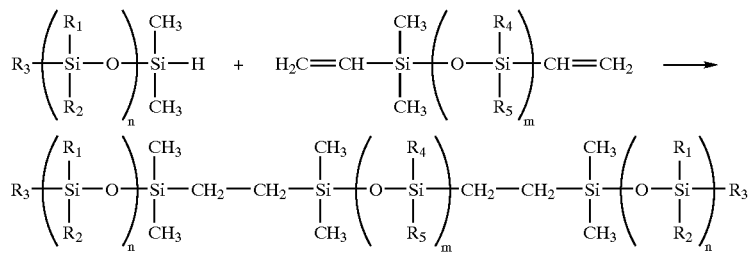

wherein $R_1$, $R_2$, $R_3$, $R_5$ are the same or different and can be $(CH_2)_pCH_3$ where p is a number of from about 0 to about 6, or from about 1 to about 4, phenyl, or $CH_2CH_2CF_3$; $R_3$ is H or $(CH_2)_pCH_3$ where p is a number of from about 0 to about 6, or from about 1 to about 4; $R_6$ is $CH_2=CH$, $(CH_2)_pCH_3$ where p is a number of from about 0 to about 6, or from about 1 to about 4; n is a number of from about 10 to about 4,000; and m is a number of from about 2 to about 4000. The product above is the following Formula II:

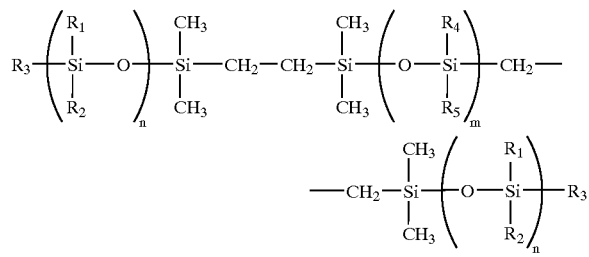

wherein $R_1$, $R_2$, $R_4$, $R_5$ are the same or different and can be $(CH_2)_pCH_3$ where p is a number of from about 0 to about 6, or from about 1 to about 4, phenyl, or $CH_2CH_2CF_3$; $R_3$ is H, or $(CH_2)_pCH_3$ where p is a number of from about 0 to about 6, or from about 1 to about 4; $R_6$ is $CH_2=CH$, $(CH_2)_pCH_3$ where p is a number of from about 0 to about 6, or from about 1 to about 4; n is a number of from about 10 to about 4,000; and m is a number of from about 2 to about 4000.

Commercially available platinum-catalyzed addition cured silicone rubbers include those available from Dow Corning, such as the silicone rubber sold under the designation DC3-6395 (one-part formulation) and DC3-6396 (two-part formulation).

The platinum-catalyzed addition cured silicone rubber can be prepared by the above process using platinum as a catalyst, along with a crosslinking agent. Suitable crosslinking agents include silanes such as 1,3,5,7-tetravinyltetramethyl cyclotetrasiloxane (T2160 available from United Chemical Technologies, Pennsylvania), tetravinylsilane (T2150 from UCT), 1,1,3,3-tetravinyldimethyldisiloxane (T2145 from UCT), and the like. The crosslinking agent is used to process the platinum catalyzed addition cured silicone in an amount of from about 0.5 to about 10 pph, or from about 2 to about 8 pph.

A low surface energy filler and/or electrically conductive filler and/or chemically reactive filler may be present in the silicone layer, the substrate, the intermediate layer(s), and/or the outer release layer. The filler if present in the outermost layer may aid in release by reacting with any functional groups in any release agent present. The electrically conductive filler may aid in controlling the charge on the fuser member to enhance performance such as non-visual offset or pre-nip toner disturbances or to enable use as a transfix or transfuse member.

Examples of suitable fillers include carbon fillers, metals, metal oxides, to doped metal oxides, ceramics, polymer fillers, and the like, and mixtures thereof. Nanofillers are also suitable for use herein, including those having particle sizes of from about from 5 to about 350 nanometers, or from about 20 to about 100 nanometers. Examples of suitable carbon fillers include carbon black (for example, N330® from Cabot, Alpharetta, Ga.) graphite, is fluorinated carbon black (for example, ACCUFLUOR® or CARBOFLUOR®), and the like, and mixtures thereof. Examples of metal fillers include aluminum, copper, silver, and the like, and mixtures thereof. Examples of suitable inorganics/ceramics include silica, silicon carbide, silicone nitride, boron nitride, aluminum nitride, boron carbide, tungsten carbide, calcium carbonate, clay, and the like, and mixtures thereof. Examples of suitable metal oxides include copper oxide, aluminum oxide, zinc oxide, titanium oxide, iron oxide, and the like, and mixtures thereof. Examples of suitable doped metal oxides include antimony doped tin oxide (such as ZELEC®, which is a trademark of DuPont Chemicals Jackson Laboratories, Deepwater, N.J.), aluminum doped zinc oxide, antimony doped titanium dioxide, similar doped oxides, and mixtures thereof. Examples of suitable polymer fillers include polyaniline, polytetrafluoroethylene powder, perfluoroalkoxy powder, ethylene chlorotrifluoroethylene, ethylene tetrafluoroethylene, polytetrafluoroethylene perfluoromethylvinylether copolymer, fluorinated ethylene propylene powder, and the like, and mixtures thereof.

In an embodiment, aluminum oxide filler and/or iron oxide filler are incorporated into the silicone elastomer layer. The aluminum oxide filler can be provided in an amount from about 50 to about 80, or from about 60 to about 75 percent by weight of total solids. The iron oxide filler can be present in an amount from about 1 to about 50, or from about 10 to about 20 percent by weight of total solids. Total solids, as used herein, refers to the total amount by weight of silicone rubber, fillers, crosslinking agents, and other like to solid materials.

In an embodiment, the filler or fillers can be coated with a silane material. This silane lowers the surface energy of the silicone elastomer layer as well as improves particle separation and particle flow. In embodiments, the silane coating reduces particle agglomeration, thus allowing more uniform particle distribution, reduced settling, and free movement of individual particles during processing. Examples of suitable silanes for coating filler(s) include, but are not limited to epoxy, vinyl, amine, phenyl, and other functional silanes, mixtures thereof, and the like. In an embodiment, the silane coating is methyltrimethoxysilane $(CH_3O)_3SiCH_3$. The amount of silane incorporated with the filler into the above-identified silicone elastomer is an amount sufficient to increase thermal stability of the silicone elastomer to repeated exposure to fusing temperatures, pressures and other fusing conditions. The silane is coated on the filler by known coupling methods.

The silicone elastomer may be spray coated, molded, flow coated, or the like, onto the substrate, or onto the optional primer, adhesive, or intermediate layer according to known procedures.

The thickness of the silicone elastomer layer is from about 1 mm to about 10 mm, or from about 3 mm to about 7 mm, or from about 4 mm to about 6 mm. The above-identified silicone elastomer layer has a hardness of from about 50 to about 78, or from about 55 to about 75, or from about 60 to about 65 Shore A. The thermal conductivity is from about $1 \times 10^{-7}$ to about $1 \times 10^{-1}$, or about $1.5 \times 10^{-3}$. The toughness is from about 250 to about 450, or from about 350 to about 380 lb/in$^3$. The modulus is from about 500 to about 800 psi.

Optionally, an outer release layer may be coated on the silicone layer using known techniques such as spray coating, dip coating, flow coating, or the like. In embodiments, an outer fluoroelastomer layer can be present on the silicone layer, or on an adhesive, primer or other intermediate layer positioned between the silicone material layer and the outer fluoroelastomer layer.

Examples of suitable fluoroelastomers include copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON 910®, VITON GH®, VITON B50®, and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS$^{rm}$ a poly(propylene-tetrafluoroethylene) and FLUOREL II® (LII900) a poly(propylene-tetrafluoroethylene vinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Two specific known fluoroelastomers are (1) a class of copolymers of one or more of, or any combination of vinylidenefluoride, tetrafluoroethylene and hexafluoropropylene known commercially as VITON A® and (2) a class of terpolymers of vinylidenefluoride, hexafluoropropylene, and tetrafluoroethylene known commercially as VITON B®, VITON A®, and VITON B®, and other VITON® designations are trademarks of E.I. DuPont de Nemours and Company.

In another embodiment, the fluoroelastomer is a tetrapolymer having a relatively low quantity of vinylidenefluoride. An example is VITON GF®, available from E.I. DuPont de Nemours, Inc. The VITON GF® has about 35 weight percent of vinylidenefluoride, about 34 weight percent of hexafluoropropylene and about 29 weight percent of tetrafluoroethylene with about 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

In another embodiment, the fluoroelastomer is a volume grafted elastomer. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane. Examples of specific volume graft elastomers are disclosed in U.S. Pat. No. 5,166,031; U.S. Pat. No. 5,281,506; U.S. Pat. No. 5,366,772: and U.S. Pat. No. 5,370,931, the disclosures of which are herein incorporated by reference in their entirety.

The outer release layer can be coated on the silicone layer or on an adhesive, primer or other intermediate layer, to a thickness of from about 10 to about 65, or from about 15 to about 40 μm, in the case of a fuser roller. For a belt fusing component, the thickness of the outer release layer is from about 2 to about 7, or from about 3 to about 4 mm.

The fusing component can be of any suitable configuration. Examples of suitable configurations include a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like.

Optionally, any known and available suitable adhesive, primer or intermediate layer may be positioned between the silicone layer and the substrate, and/or between the silicone layer and the outer release layer. Examples of suitable adhesives include silanes such as amino silanes (such as, for example, A1100 from OSI Specialties, Friendly W. Va.), titanates, zirconates, aluminates, and the like, and mixtures thereof. In an embodiment, an adhesive in from about 0.25 to about 10 percent solution, can be wiped on the substrate. The adhesive layer can be coated on the substrate, or on the silicone layer, to a thickness of from about 2 to about 2,000 nanometers, or from about 2 to about 500 nanometers. The adhesive can be coated by any suitable, known technique, including spray coating or wiping.

Specific embodiments of the invention will now be described in detail. These examples are intended to be illustrative, and the invention is not limited to the materials, conditions, or process parameters set forth in these embodiments. All parts are percentages by volume of total solids unless otherwise indicated.

EXAMPLES

Example 1
Stability Testing of Platinum Catalyzed Addition Cured Silicone Rubber A platinum catalyzed addition cured silicone rubber (DC3-6395) was purchased from Dow Corning. The silicone rubber was processed by adding a crosslinker (a vinyl functional siloxane coupled with a platinum catalyst). The rubber filler content and crosslinker content were varied in uniform increments in order to determine stability of fuser member over time. The samples were evaluated for Shore A hardness changes over time. The length of time ranged up to 8 weeks and the temperature was 204° C. in a flow through oven.

Expressions showing a variation of both the hardness and the thermal conductivity with only concentration changes was determined and is shown in the first two equations below. An estimate of the relationship between hardness change with both concentration and age time is expressed by the third equation. The regression expressions below were derived from the experimental data using a plus one and a minus one to represent the high/low concentrations levels and the initial/aged values of the independent variables, i.e., the filler and crosslinker concentration levels as well as the oven age time. Hardness is expressed as Shore A and Thermal Conductivity as W/Msec. The variables are identified below.

A=Filler level, B=crosslinker level and C=oven age time

Hardness (time zero)=4.5A+3.25B=2.25BC

Thermal Conductivity (time zero)=0.09A−00.01B+0.70

Hardness=4.25A+3.25B+8.5C+2.25BC+77

The minus-value for both the filler level and the crosslinker level represent the standard formulation of the DC3-6395 and is called Formula 1. The BC interaction in the third equation suggests that the lower level of crosslinker may have a beneficial influence by keeping the hardness increase less pronounced during aging.

Example 2
Physical Analysis of Molded Test Parts

The above-identified silicone elastomer composition exhibits superior heat age stability as measured by initial rubber property values and changes in these properties as the pads or rolls were oven/fixture tested. The initial, non-age rubber properties were used to screen other candidate materials and discard unacceptable rubbers before the age test began. Two important initial properties were hardness and thermal conductivity, wherein the acceptable candidate was required to have the highest thermal conductivity at the required hardness. Table I below displays some candidate silicone rubbers and the initial test results. Standard hardness and thermal conductivity testing was performed.

TABLE I

| Candidate Rubber | Shore A Hardness | Thermal Conductivity W/Msec |
|---|---|---|
| DC 6395 Pt catalyzed | 63(Required Hardness) | 0.62 |
| DC 591 Pt catalyzed | 70 | 0.40 |
| ECD LEW Condensation Crosslinked Sn catalyzed | 64 | 0.56 |
| DC 437 HTV at 170 Parts Al$_2$O$_3$ peroxide catalyzed | 66 | 0.53 |
| X 727 Sn catalyzed | (51 measured) 51* for 6395 | (0.33 measured) 0.36* for 6395 |

Measured data for the X727 (a boron nitride filled silicone rubber described in U.S. Pat. No. 4,763,158) is shown along with calculated data for the DC6395, where the regression equations were used to obtain the thermal conductivity at the hardness of the X727. Note that this is only an estimate, especially since the hardness levels calculated were outside the design range of the statistical experiment. The hardness calculated data compared very favorably to the measured data for all treatment combinations in the statistical designed experiment.

Example 3
Demonstration Example of Test Pads and Rolls

Another sample of DC 6395 was purchased from Dow Corning, and was tested by coating test rolls and then aging the rollers in ovens and on fixtures. Test pads were also oven aged and the Shore A hardness ratio (aged hardness/initial hardness) was plotted and compared to curves of the modulus change found in similar rolls that were oven and fixture tested.

Figure 5:
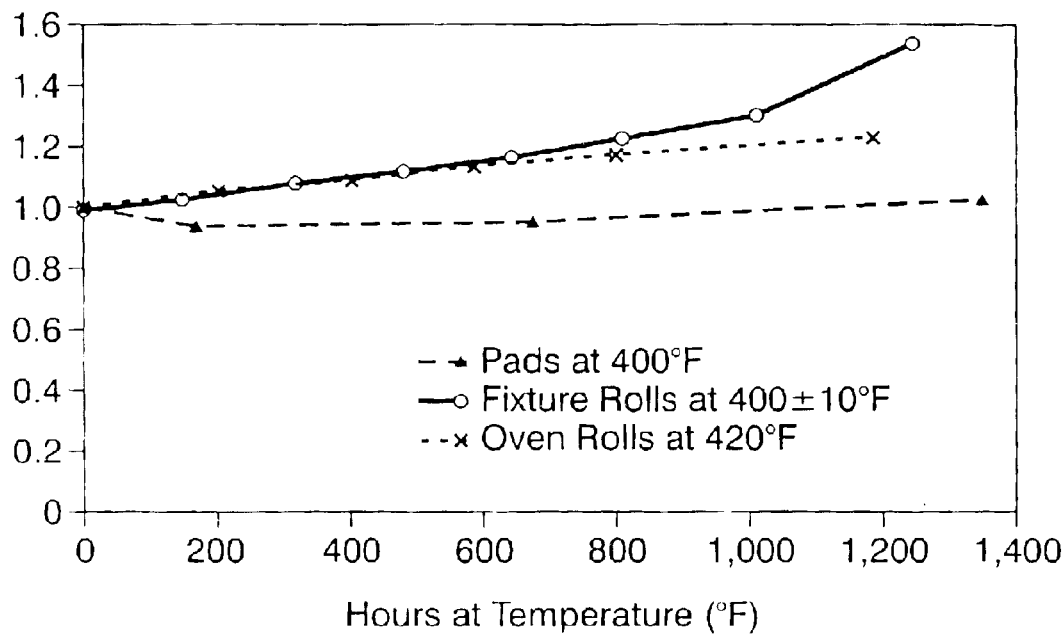
FIG. 5 is a graph showing hardness versus hours at a certain temperature for an embodiment of a platinum catalyzed addition curable vinyl terminated polyorganosiloxane layer.
Figure 6:
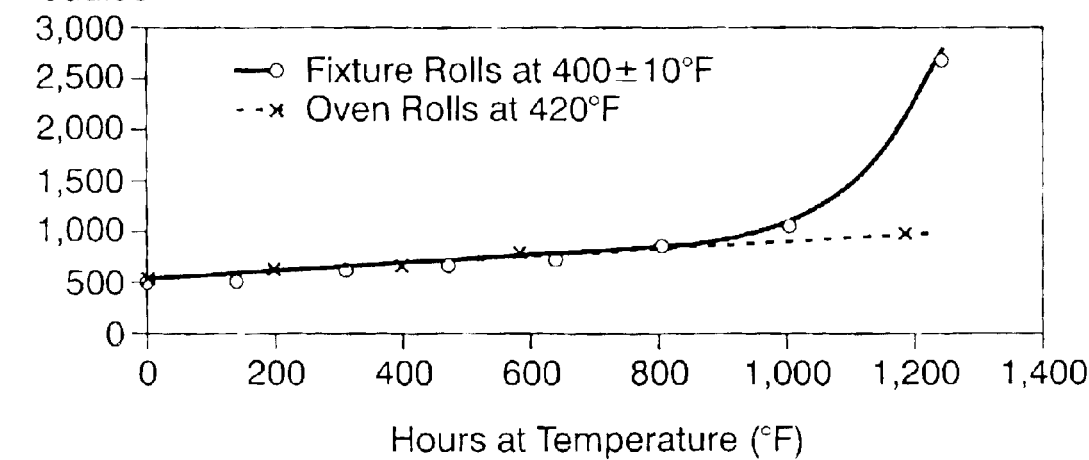
FIG. 6 is a graph of modulus versus hours at a certain temperature for an embodiment of a platinum catalyzed addition curable vinyl terminated polyorganosiloxane layer.

The graphs of FIGS. 5 and 6 illustrate that although the DC 6395 is temperature stable for an extended period, fixture compaction may eventually be a failure mode, so it was tested separately.

Figure 7:
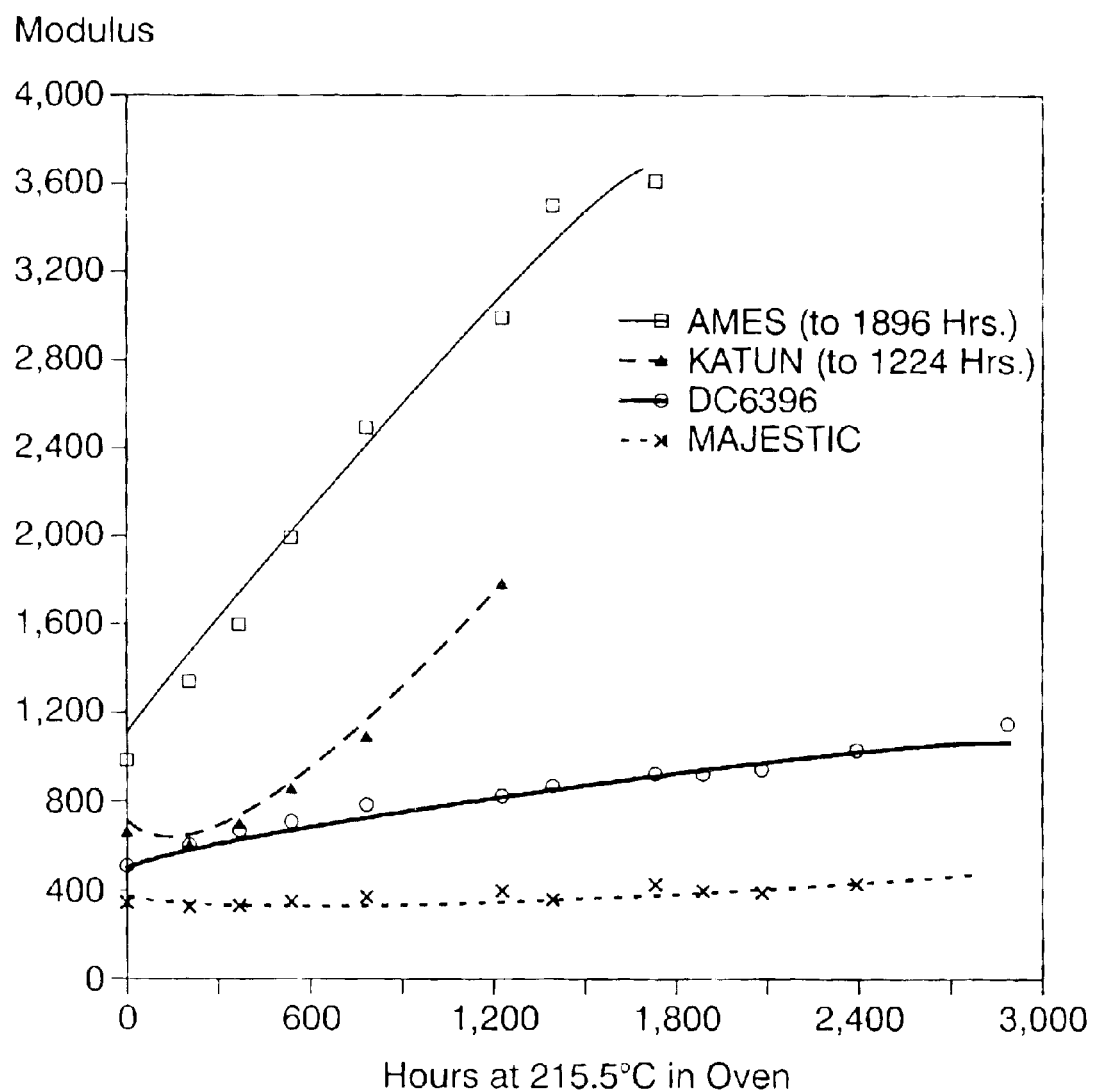
FIG. 7 is a graph showing modulus versus hours at 215.5° C. in an oven for an embodiment of a platinum catalyzed addition curable vinyl terminated polyorganosiloxane layer.

A graph as shown in FIG. 7 compares the DC 6395 to other candidates. Once again, the DC 6395 shows desired results, including a minimum modulus change with oven age time, thus remaining within the required functional modulus range of 500 to 800 psi. Candidate fuser rolls were oven-aged at 212.5° C. for about 3,000 hours. As shown in the graph, the 6396 remains stable with respect to modulus over the tested time frame.

Example 4
Demonstration Example of Test Pads and Rolls

Figure 8:
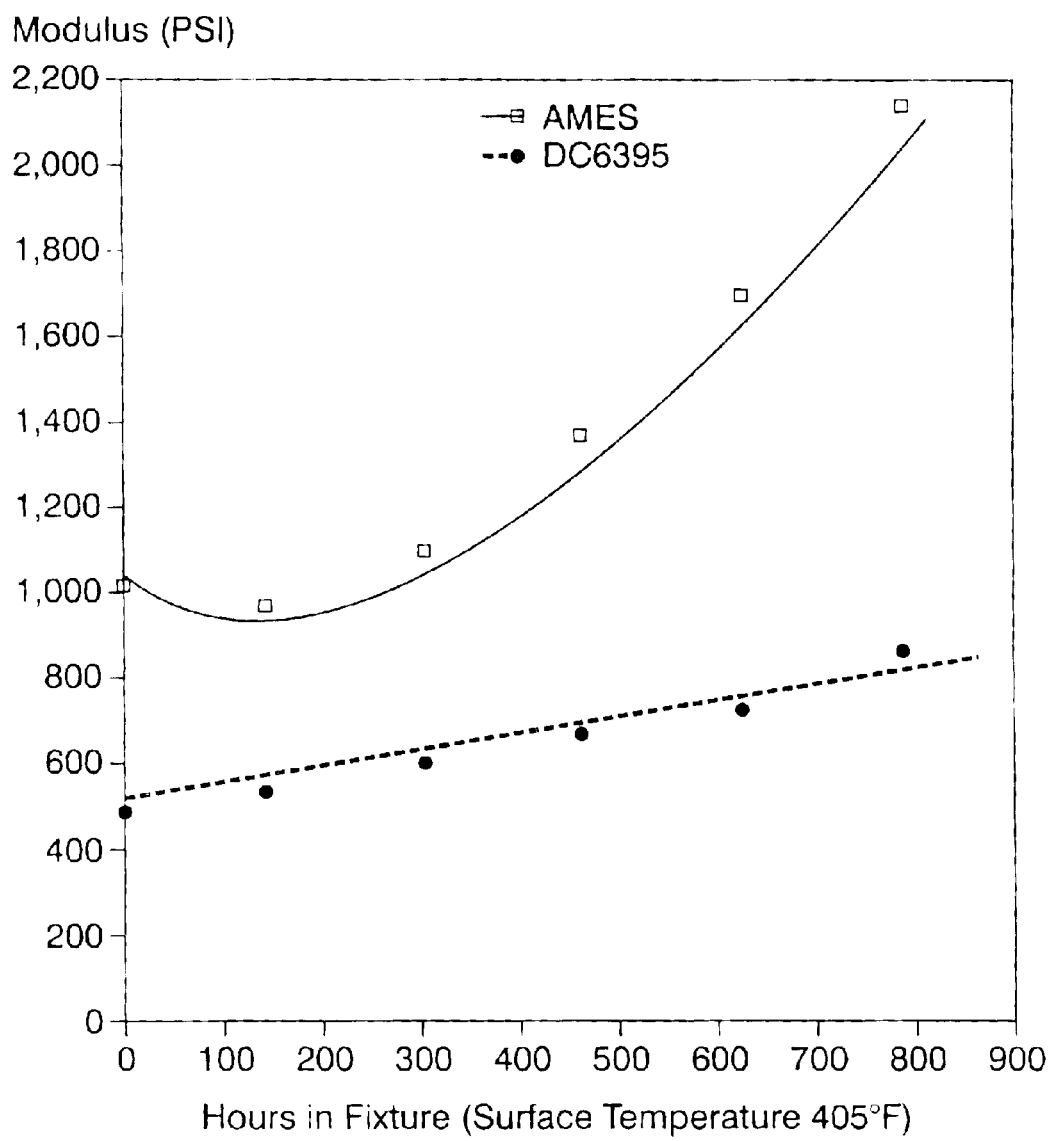
FIG. 8 is a graph of modulus versus hours at 405° F. for a platinum catalyzed addition curable vinyl terminated polyorganosiloxane (DC-6395) and the leading HTV (high temperature vulcanized silicone rubber) from Ames.

Two representative test rolls were prepared according to their respective or anticipated roll coating procedures. One was a vendor coated HTV and the other was DC6395. Data for the DC 6395 and the leading HTV silicone rubber contender was taken from a fixture test that was designed to be somewhat similar to the expected application. The two Modulus (PSI) versus Hours in Fixture curves are displayed in the graphs of FIG. 8. The curves give a clear demonstration that a minimal change in modulus was observed with the DC6395, while the other candidate, an HTV, was shown to be unacceptable.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member for fixing a developed image to a copy substrate comprising:
   a) a substrate; and thereover
   b) a silicone rubber layer comprising the crosslinked product of:
      i) at least one platinum catalyzed addition curable polyorganosiloxane having the following Formula I:

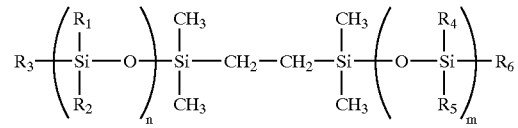

wherein $R_1$, $R_2$, $R_4$, $R_5$ are the same or different and are selected from the group consisting of $(CH_2)_pCH_3$ wherein p is a number of from about 0 to about 6, phenyl, and $CH_2CH_2CF_3$; $R_3$ is selected from the group consisting of H and $(CH_2)_pCH_3$ where p is a number of from 0 to about 6; $R_4$ is selected from the group consisting of $CH_2=CH$ and $(CH_2)_pCH_3$ where p is a number of from 0 to about 6; n is a number of from about 10 to about 4,000; and m is a number of from about 2 to about 4000;

ii) aluminum oxide fillers;
   iii) iron oxide fillers: and
   iv) a crosslinking agent selected from the group consisting of 1,3,5,7-tetravinyltetramethyl cyclotetrasiloxane, tetravinylsilane, and 1,1,3,3-tetravinyldimethyldisiloxane.

2. A fuser member in accordance with claim 1, wherein p in $(CH_2)_pCH_3$ of $R_1$, $R_2$, $R_3$, $R_4$, $R_5$, and $R_6$ in Formula I is from about 1 to about 4.

3. A fuser member in accordance with claim 1, wherein said fuser member further comprises an outer layer positioned on said silicone rubber layer, wherein said outer layer comprises a fluoroelastomer.

4. A fuser member in accordance with claim 3, wherein said fluoroelastomer is selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene and a cure site monomer.

5. A fuser member in accordance with claim 4, wherein said fluoroelastomer comprises about 35 weight percent of vinylidene fluoride, about 34 weight percent of hexafluoropropylene, about 29 weight percent of tetrafluoroethylene, and about 2 weight percent cure site monomer.

6. A fuser member in accordance with claim 1, wherein said aluminum oxide fillers are present in an amount of from about 50 to about 80 percent by weight of total solids.

7. A fuser member in accordance with claim 1, wherein said iron oxide fillers are present in an amount of from about 1 to about 50 percent by weight of total solids.

8. A fuser member in accordance with claim 1, wherein said aluminum oxide fillers comprise a silane coating.

9. A fuser member in accordance with claim 8, wherein said silane coating is selected from the group consisting of epoxy silane, vinyl silane, amine silane, methyltrimethoxysilane, and phenyl silane.

10. A fuser member in accordance with claim 1, wherein said iron oxide fillers comprise a silane coating.

11. A fuser member in accordance with claim 10, wherein said silane coating is selected from the group consisting of epoxy silane, vinyl silane, amine silane, methyltrimethoxysilane, and phenyl silanes.

12. A fuser member in accordance with claim 1, wherein said silicone rubber layer has a thickness of from about 1 mm to about 10 mm.

13. A fuser member in accordance with claim 1, wherein said silicone rubber layer has a hardness from about 50 to about 78 Shore A.

14. A fuser member in accordance with claim 1, wherein said silicone rubber layer has a modulus of from about 500 to about 800 psi.

15. An image forming apparatus for forming images on a recording medium comprising:
a charge-retentive surface to receive an electrostatic latent image thereon;
a development component to apply toner to said charge-retentive surface to develop an electrostatic latent image to form a developed image on said charge retentive surface;
a transfer film component to transfer the developed image from said charge retentive surface to a copy substrate; and
a fusing component for fusing toner images to a surface of said copy substrate, said fusing component comprising:
a) a substrate; and thereover
b) a silicone rubber layer comprising the crosslinked product of:

i) at least one platinum catalyzed addition curable polyorganosiloxane having the following formula I:

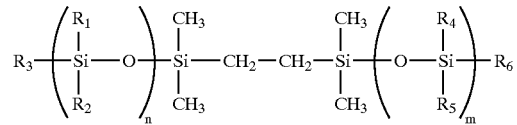

wherein $R_1$, $R_2$, $R_4$, $R_5$ are the same or different and are selected from the group consisting of $(CH_2)_pCH_3$ wherein p is a number of from 0 to about 6, phenyl, and $CH_2CH_2CF_3$; $R_3$ is selected from the group consisting of H and $(CH_2)_pCH_3$ where p is a number of from about 0 to about 6; $R_6$ is selected from the group consisting of $CH_2=CH$ and $(CH_2)_pCH_3$ where p is a number of from 0 to about 6; n is a number of from about 10 to about 4,000;
ii) aluminum oxide fillers;
iii) iron oxide fillers; and
iv) a crosslinking agent selected from the group consisting of 1,3,5,7-tetravinyltetramethyl cyclotetrasiloxane, tetravinylsilane, and 1,1,3,3-tetravinyldimethyldisiloxane.

16. A fuser member for fixing a developed image to a copy substrate comprising:
a) a substrate; and thereover
b) a silicone rubber layer comprising the crosslinked product of:
i) at least one platinum catalyzed addition curable polyorganosiloxane having the following Formula II:

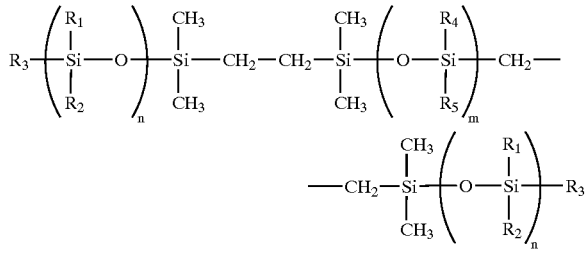

wherein $R_1$, $R_2$, $R_4$, $R_5$ are the same or different and are selected from the group consisting of $(CH_2)_pCH_3$ wherein p is a number of from 0 to about 6, phenyl, and $CH_2CH_2CF_3$; $R_3$ Is selected from the group consisting of H and $(CH_2)_pCH_3$ where p is a number of from 0 to about 6; $R_4$ is selected from the group consisting of $CH_2=CH$ and $(CH_2)_pCH_3$ where p is a number of from 0 to about 6; n is a number of from about 10 to about 4,000;
ii) aluminum oxide fillers;
iii) iron oxide fillers;
iv) a crosslinking agent selected from the group consisting of 1,3,5,7-tetravinyltetramethyl cyclotetrasiloxane, tetravinylsilane, and 1,1,3,3-tetravinyldimethyldisiloxane.

17. A fuser member in accordance with claim 16, wherein p in $(CH_2)_pCH_3$ of $R_1$, $R_2$, $R_3$, $R_4$ $R_5$, and $R_6$ in Formula II is from about 1 to about 4.

* * * * *